United States Patent [19]
Okamoto

[11] Patent Number: 5,408,635
[45] Date of Patent: Apr. 18, 1995

[54] METHOD OF CONTROLLING DATA OUTPUT BY DIRECT MEMORY ACCESS

[75] Inventor: Yoshifumi Okamoto, Yokohama, Japan

[73] Assignee: Canon Kabushiki Kaisha, Tokyo, Japan

[21] Appl. No.: 243,522

[22] Filed: May 16, 1994

Related U.S. Application Data

[63] Continuation of Ser. No. 732,751, Jul. 19, 1991, abandoned.

[30] Foreign Application Priority Data

Jul. 27, 1990 [JP] Japan ................... 2-198008

[51] Int. Cl.$^6$ ............................................. G06F 12/04
[52] U.S. Cl. ......................... 395/425; 364/DIG. 1; 364/251.1; 364/251.3
[58] Field of Search ... 364/200 MS File, 900 MS File; 395/400, 425

[56] References Cited

U.S. PATENT DOCUMENTS

| | | | |
|---|---|---|---|
| 4,467,447 | 8/1984 | Takahashi et al. | 395/250 |
| 4,914,573 | 4/1990 | Scales, III et al. | 395/425 |
| 4,914,675 | 4/1990 | Fedele | 375/25 |
| 4,963,867 | 10/1990 | Bertrand | 341/60 |
| 5,119,092 | 6/1992 | Sumi et al. | 341/60 |
| 5,151,993 | 9/1992 | Yamahata | 395/775 |

*Primary Examiner*—Joseph L. Dixon
*Assistant Examiner*—Hiep T. Nguyen
*Attorney, Agent, or Firm*—Fitzpatrick, Cella, Harper & Scinto

[57] ABSTRACT

An output control method includes the step of outputting a predetermined portion of data obtained by first direct memory access as last data of one line, checking whether the data obtained by the access includes data other than the last data, performing direct memory access again with respect to data at the same address as that in the previous access as start data of a line next to the previous line when it is determined that the obtained data includes data other than the last data, and outputting a predetermined portion of the data obtained by the second access as the start data. An output control apparatus for this method is also disclosed.

6 Claims, 6 Drawing Sheets

METHOD OF CONTROLLING DATA OUTPUT BY DIRECT MEMORY ACCESS

This application is a continuation of application Ser. No. 07/732,751 filed Jul. 19, 1991, which is now abandoned.

BACKGROUND OF THE INVENTION

1. Field of the Invention

The present invention relates to a method of controlling an output operation when output data stored in a memory is read out and transferred to an output unit by direct memory access (DMA).

2. Related Background Art

A conventional printer such as a laser beam printer receives image information, e.g., bit map data, supplied from a host computer or the like, and temporarily develops the image information into a bit image in an internal random access memory (RAM). When a bit image corresponding to, e.g., one page is developed in the internal memory in this manner, this bit image is read out to be printed on, e.g., a recording paper sheet. In such a printer, when a bit image developed in the memory is to be read out and transferred to a mechanical section, if the print speed is low, the transfer rate based on program control by the CPU (central processing unit) of the printer is enough for the transfer operation. In a high-speed printer, however, since data transfer at higher speed is required, print data is read out from the internal memory and transferred to the printing mechanical unit to be printed, by means of, e.g., DMA (direct memory access).

In the conventional printer described above, however, even if, for example, the minimum unit of data to be processed by the printer is 4 bytes (32 bits), the length of one line does not necessarily correspond to a multiple of 4 bytes. If, for example, the data length of one line is (an integer multiple of 4 bytes + 1 byte), only 1-byte print data exists in the last 4-byte data storage area of one line, and no data is stored in the area of the remaining 3 bytes. In such a case, an empty area corresponding to 3 bytes is produced in the data storage area of one line.

In such a printer, in the above case, for example, an area corresponding to an integer multiple of 4 bytes as the minimum data unit is ensured as the data storage area of one line. Even if the amount of data to be printed on one line is not an integer multiple of 4 bytes as in the above case, the data storage area of one line is not changed. Therefore, when image data including 4,000 lines per page is to be printed, provided that the data length of one line is not a multiple of 4 bytes as in the above case, an empty area corresponding to 4,000×3 bytes = 12 Kbytes exists, in the memory, for each image data corresponding to one page. This is because, in the conventional techniques, it is very difficult to store print data in a memory in a packed state without producing empty areas, and processing for such an operation consumes much time. Under the circumstances, however, a large area which is not actually used is ensured in a memory.

SUMMARY OF THE INVENTION

It is an object of the present invention to provide an output control method which allows data consecutively stored in a memory to be read out by DMA even if the data length of one output line is not an integer multiple of the transfer unit of DMA.

It is another object of the present invention to provide an output control method which allows a memory to consecutively store data to be read out by DMA even if the data length of one output line is not an integer multiple of the transfer unit of DMA.

According to one aspect, the present invention which achieves these objectives relates to an output control method comprising the steps of outputting a predetermined portion of data obtained by first direct memory access as last data of one line, checking whether the data obtained by the access includes data other than the last data, performing direct memory access again with respect to data at the same address as that in the previous access as start data of a line next to the previous line when it is determined that the obtained data includes data other than the last data, and outputting, a predetermined portion of the data obtained by the second access, as the start data.

According to another aspect, the present invention which achieves these objectives relates to an output control apparatus for controlling a data output operation performed by direct memory access, comprising first output control means for performing control to output a predetermined portion of data obtained by first direct memory access when last data of one line is output, determining means for checking whether the data obtained by the first access includes data other than the last data, access control means for performing control to perform direct memory access again with respect to the same address as that in the previous access to obtain start data of a line next to the previous line when said determining means determines that the data includes data other than the last data, and second output control means for performing control to output a predetermined portion, of the data obtained by the second access, as the start data.

Other objectives and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

An embodiment of the present invention will be described below with reference to the accompanying drawings.

Figure 1:
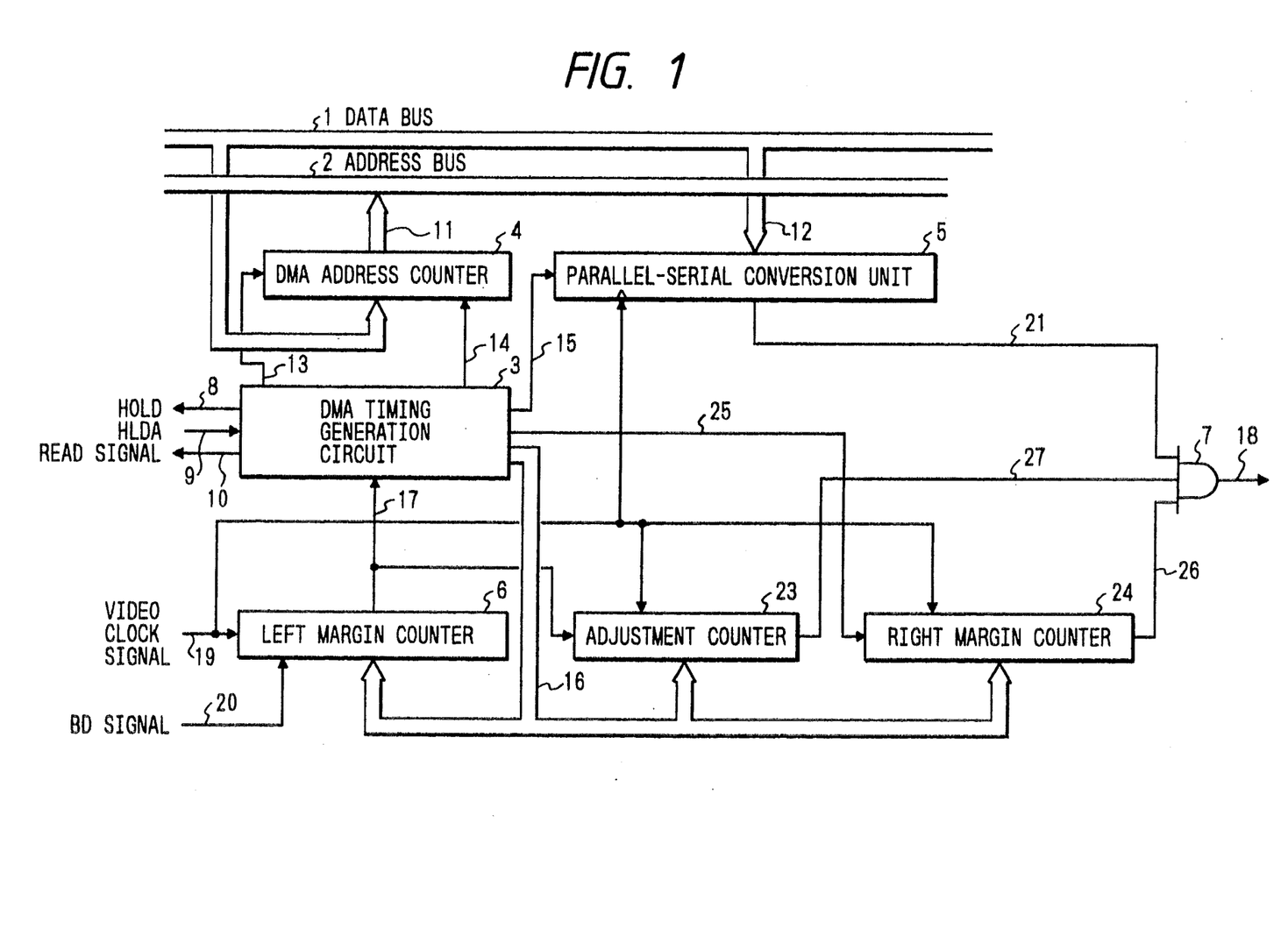
FIG. 1 is a block diagram showing a circuit arrangement of a video interface unit of a printer according to an embodiment of the present invention.
Figure 2:
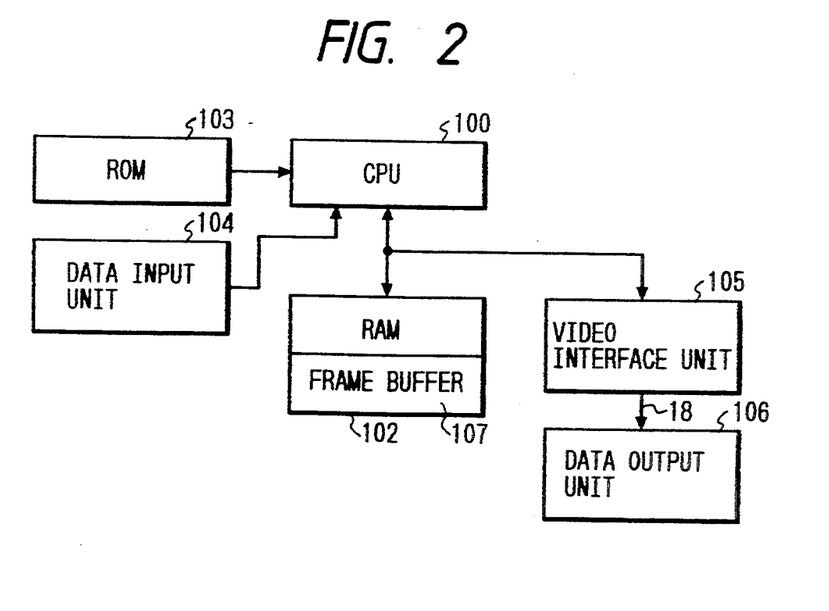
FIG. 2 is a block diagram showing a schematic arrangement of the overall printer according to the embodiment in FIG. 1.

Description of Printer (FIGS. 1 and 2)

FIG. 2 is a block diagram showing a schematic arrangement of an overall printer having a video interface circuit according to this embodiment.

Referring to FIG. 2, a CPU (central processing unit) 100 controls the overall printer, and performs various types of control in accordance with control programs stored in a ROM (read-only memory) 103. A RAM (random access memory) 102 as a data memory is used as a work area of the CPU 100. The ROM 103 includes a frame buffer 107 for storing an image developed into a bit map, and a memory area for temporarily holding various types of data. A data input unit 104 for inputting data such as document data is constituted by a keyboard and the like. A video interface unit 105 reads out the developed bit image in the RAM 102, converts it into a video signal, and outputs the video signal. A data output unit 106 serves to record an image on a recording medium such as a recording paper sheet on the basis of the video signal output from the video interface unit 105.

FIG. 1 is a block diagram showing a circuit arrangement of the video interface unit 105.

Referring to FIG. 1, a data bus 1 and an address bus 2 extending from the CPU 100 are connected to the RAM 102. A DMA timing generation circuit 3 performs DMA control and timing control for video conversion. A DMA address counter 4 outputs an address to the address bus 2 to access the frame buffer 107 of the RAM 102 in the execution of DMA. An output 11 from the DMA address counter 4 is enabled when an output enable signal 13 is set at low level. The DMA address counter 4 is counted up or down by counter clocks 14 output from the DMA timing generation circuit 3. Assume that an initial value is set in the DMA address counter 4 by the CPU 100 through the data bus 1, and that 4-byte data is transferred from the frame buffer 107 to a parallel-serial conversion unit 5 by one DMA transfer operation.

A HOLD signal 8 is output from the DMA timing generation circuit 3 to request DMA permission to the CPU 100. An HLDA signal 9 representing DMA permission is output from the CPU 100. A read signal 10 is output from the DMA timing generation circuit 3 in the process of DMA transfer to read-access the RAM 102. The parallel-serial conversion unit 5 latches 4-byte data read out from the frame buffer 107 through the data bus 1 at the timing of a latch signal 15 output from the DMA timing generation circuit 3. The unit 5 then converts the latched 4-byte data into a 32-bit serial signal 21 and outputs it in synchronism with a video clock signal 19.

A left margin counter 6 starts counting the video clock signals 19 when a horizontal sync signal (BD signal) 20 is input from the data output unit 106. Upon counting up to a preset count value, the left margin counter 6 outputs a video transfer request signal 17 to the DMA timing generation circuit 3. Therefore, if a value corresponding to a margin between the left end of a recording paper sheet and a print start position is set in the counter 6, the video transfer request signal 17 is output after the clock signals 19 corresponding to this margin value are counted. As a result, DMA transfer is started by the DMA timing generation circuit 3.

An adjustment counter 23 starts counting video clock signals 19 upon detection of the video transfer request signal 17 output from the left margin counter 6. Upon counting up to a preset count value, the adjustment counter 23 outputs a left video permission signal 27. By changing the value set in the adjustment counter 23, a bit length to a position at which printing of start data, of data DMA-transferred as start data, is actually started can be controlled in accordance with the number of the video clock signals 19.

Upon completion of DMA data transfer corresponding to one line, the DMA timing generation circuit 3 outputs a one-line transfer end signal 25 to a right margin counter 24. Upon detection of the one-line transfer end signal 25, the right margin counter 24 starts counting the video clock signals 19. When the right margin counter 24 counts up to a preset count value, the counter 24 outputs a low-level right video end signal 26 to end a printing operation corresponding to one line. With this operation, of the data transferred by DMA at this time, bits corresponding to a number set in the right margin counter 24 are continuously output as a video signal 18 and can be printed as the last data of one line, and the remaining data is treated as data of the next line.

Note that initial values are respectively set in the left margin counter 6, the adjustment counter 23, and the right margin counter 24 by the DMA timing generation circuit 3 through a bus 16.

A three-input AND circuit 7 performs an AND operation between the left video permission signal 27, the right video end signal 26, and the serial signal 21. The video signal 18 as the logical AND output from the AND circuit 7 is supplied to the data output unit 106 to be printed.

Figure 3:
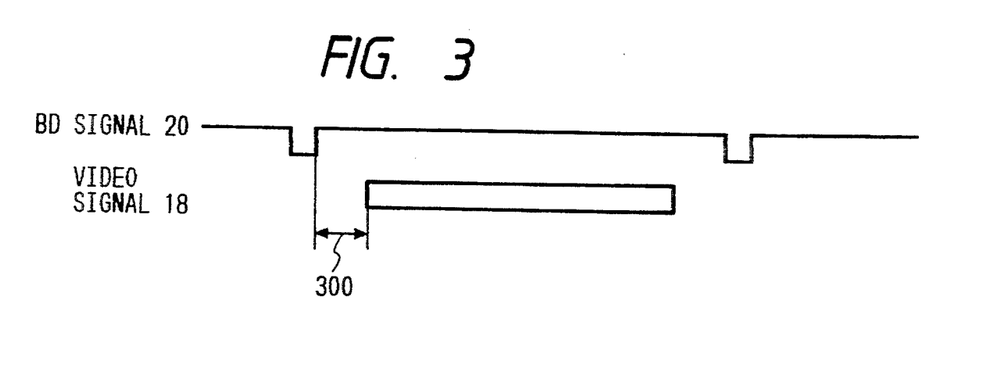
FIG. 3 is a timing chart of a horizontal sync signal and a video signal output from a data output unit in the printer of the embodiment.

FIG. 3 shows the timings of the horizontal sync signal (BD signal 20) input from the data output unit 106 and of the video signal 18.

In general, the BD signal 20 is output from the data output unit 106 at a timing corresponding to a position before the left end of a recording paper sheet. Therefore, for example, a value corresponding to a length 300 in FIG. 3 is set in the left margin counter 6 so that the video signal 18 is output when a laser beam from the data output unit 106 reaches the effective print area of a recording paper sheet.

More specifically, the CPU 100 develops a bit image in the frame buffer 107 of the RAM 102 and subsequently outputs a print request to the data output unit 106. The start address of the bit image stored in the frame buffer 107 is then set in the DMA address counter 4. With this operation, the data output unit 106 prepares for a print operation, and outputs the BD signal 20 when the laser beam reaches a position near the left end of a recording paper sheet, thus requesting the video signal 18. Assume that a time value corresponding to the distance (300) from the BD position to the left end of the recording paper sheet has already been set in the left margin counter 6 by this time. With this operation, printing can be properly started from the left end of the effective print area.

Figure 4:
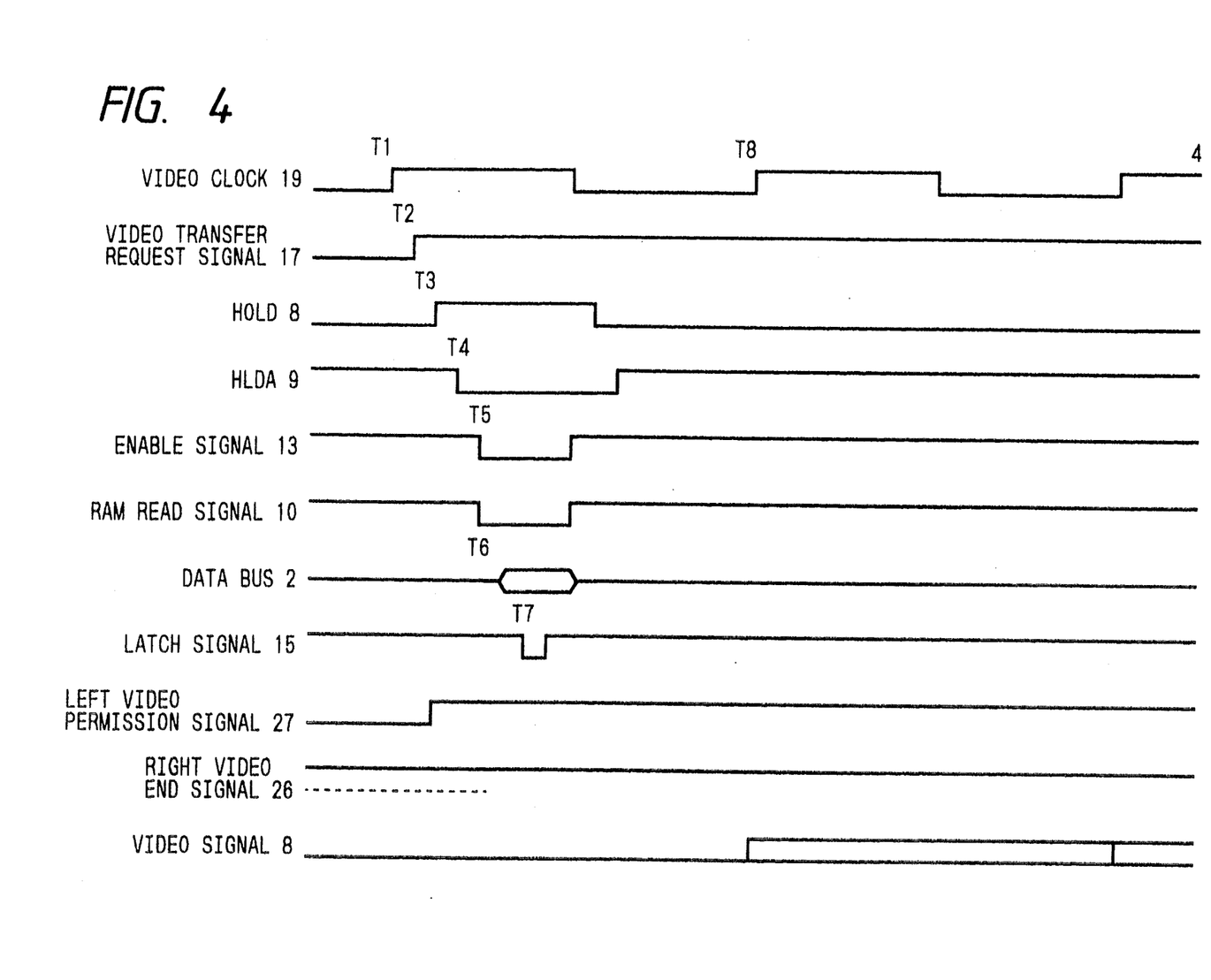
FIG. 4 is a timing chart showing a timing at which a video signal is output in the video interface unit of the embodiment.

Description of Print Timing (FIG. 4)

FIG. 4 is a timing chart showing an output operation of the video signal 18 after a laser beam reaches an effective print area.

Upon detection of the BD signal 20, the left margin counter 6 starts counting the video clock signals 19. When the counter 6 counts up to a preset count value, it outputs the video transfer request signal 17 (at a timing T2). In response to the signal 17, the DMA timing generation circuit 3 outputs the DMA transfer request HOLD signal 8 to the CPU 100. In response to the signal 8, the CPU 100 outputs the HLDA signal 9 for permitting DMA transfer (at a timing T4), thus starting DMA transfer.

Upon reception of the HLDA signal 9, the DMA timing generation circuit 3 outputs the output enable signal 13 and the read signal 10 to the DMA address counter 4 and the RAM 102, respectively, thereby accessing the frame buffer 107 of the RAM 102 (at a timing T5).

When data (4 bytes) is read out from the frame buffer 107 of the RAM 102 in this manner (at a timing T6), the DMA timing generation circuit 3 outputs the latch signal 15 to latch the read 4-byte data into the parallel-serial conversion unit 5 (at a timing T7).

Upon detection of the video transfer request signal 17 output from the left margin counter 6, the adjustment counter 23 starts counting the video clock signals 19. If the data of the first line is to be printed at this time, "0" has been set in the adjustment counter 23 by the DMA timing generation circuit 3 through the bus 16. Therefore, the left video permission signal 27 is in a true state (high level) (at a timing T2). In addition, since a counting operation of the right margin counter 24 is not started at this time, the video end signal 26 is in a false state (high level).

When the next video clock signal 19 rises (at a timing T8), the data latched by the parallel-serial conversion unit 5 is converted into the serial signal 21 and is output in units of bits. The serial signal 21 is input to the AND circuit 7. Since the left video permission signal 27 is in a truth state (high level), and the right video end signal 26 is in a false state (high level) at this time, the serial signal 21 is output, as the video signal 18 from the AND circuit 7, to the data output unit 106.

When the 32-bit serial signal 21 corresponding to one data unit is completely output in this manner, the DMA timing generation circuit 3 outputs the counter clock 14 to the DMA address counter 4 so as to increment the value of the DMA address counter 4 by one. With this operation, the next address of the frame buffer 107 is accessed.

Figure 5:
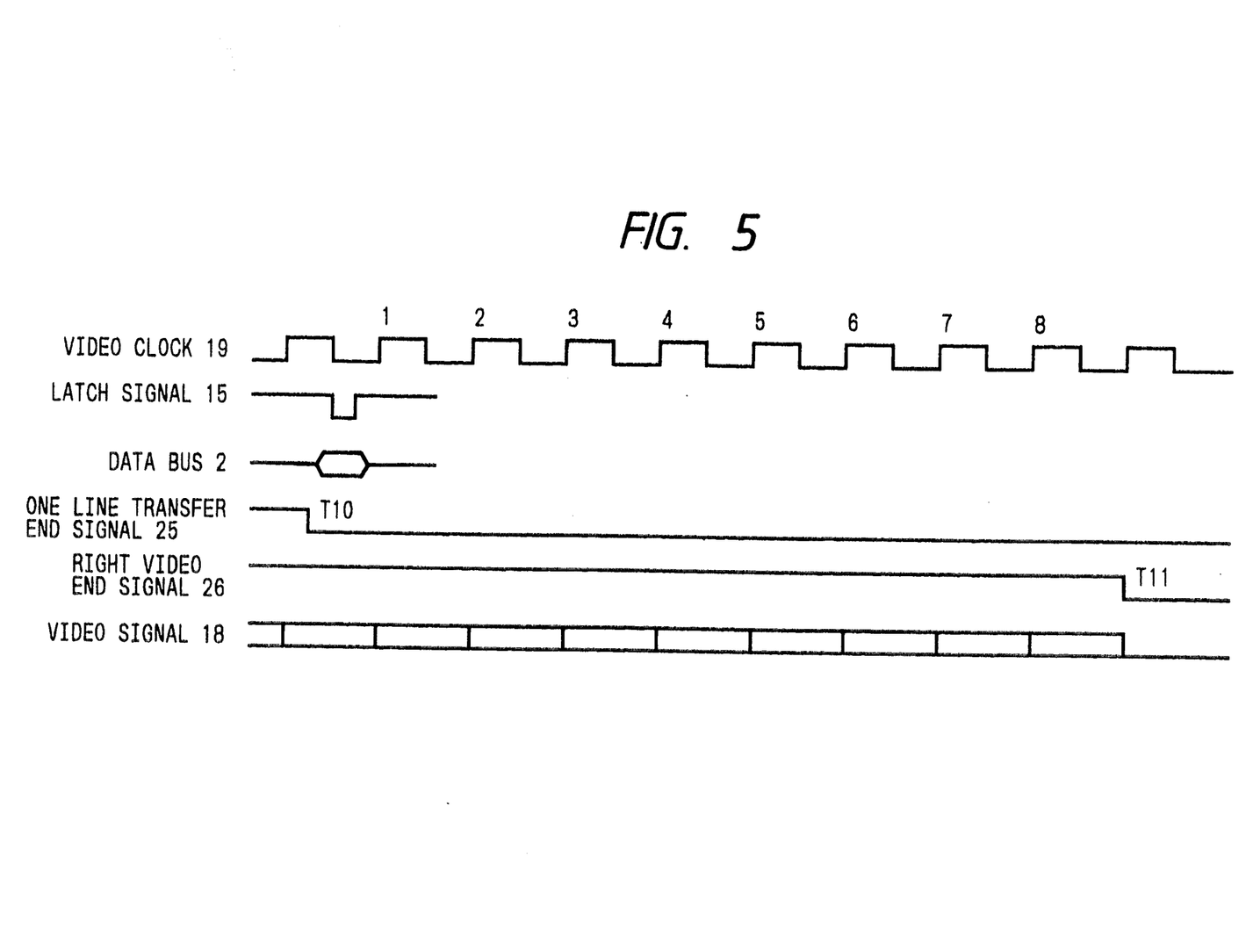
FIG. 5 is a timing chart showing a timing at which the end address of one line is accessed in the video interface unit of the embodiment.

FIG. 5 shows a timing when such an operation is repeatedly executed within one line, and 4-byte data is printed at the last position of one line.

When the last address of one line in the frame buffer 107 is accessed, the DMA timing generation circuit 3 outputs the one-line transfer end signal 25 (at a timing T10). Upon reception of the signal 25, the right margin counter 24 starts counting the video clock signals 19. Assume that "8" is set in the right margin counter 24 through the bus 16.

When the right margin counter 24 counts eight pulses of the video clock signal 19, the right video end signal 26 is set in a true state (low level) (at a timing T11). As a result, an output from the AND circuit 7 is set at low level, and output of the video signal 18 is inhibited. As described above, a number set in the right margin counter 24 represents the number of bits of a video signal, of the last 4-byte data (32 bits), which is output as print data of the corresponding line.

Figure 6:
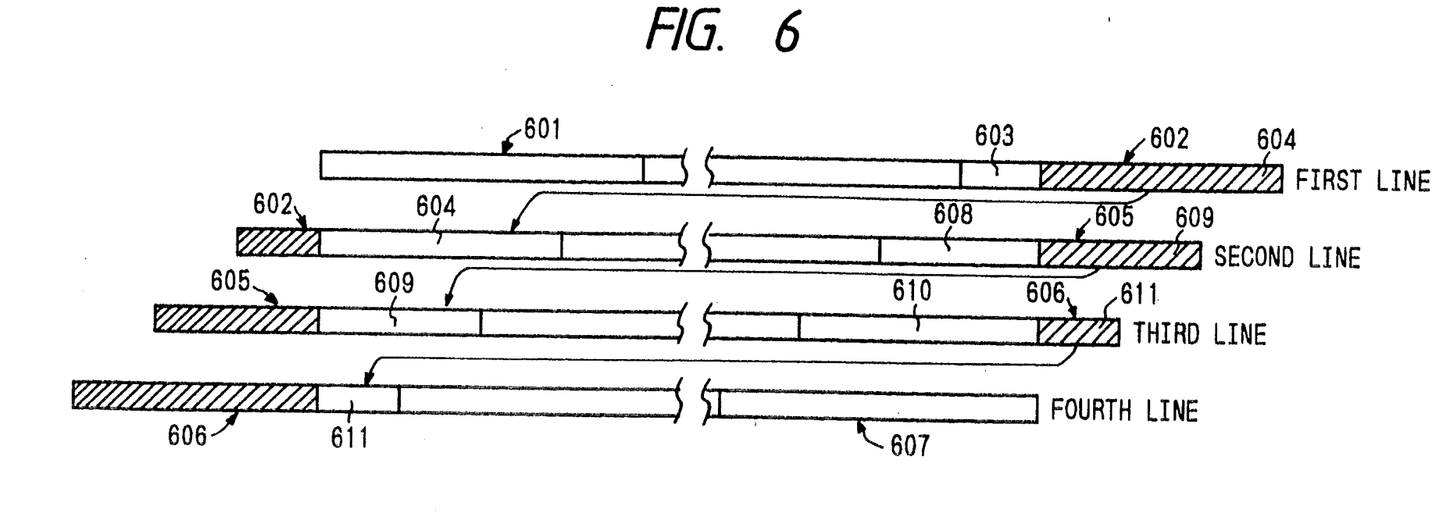
FIG. 6 is a view showing byte data which is printed and byte data which is not printed on each line of the printer of the embodiment.
Figure 7:
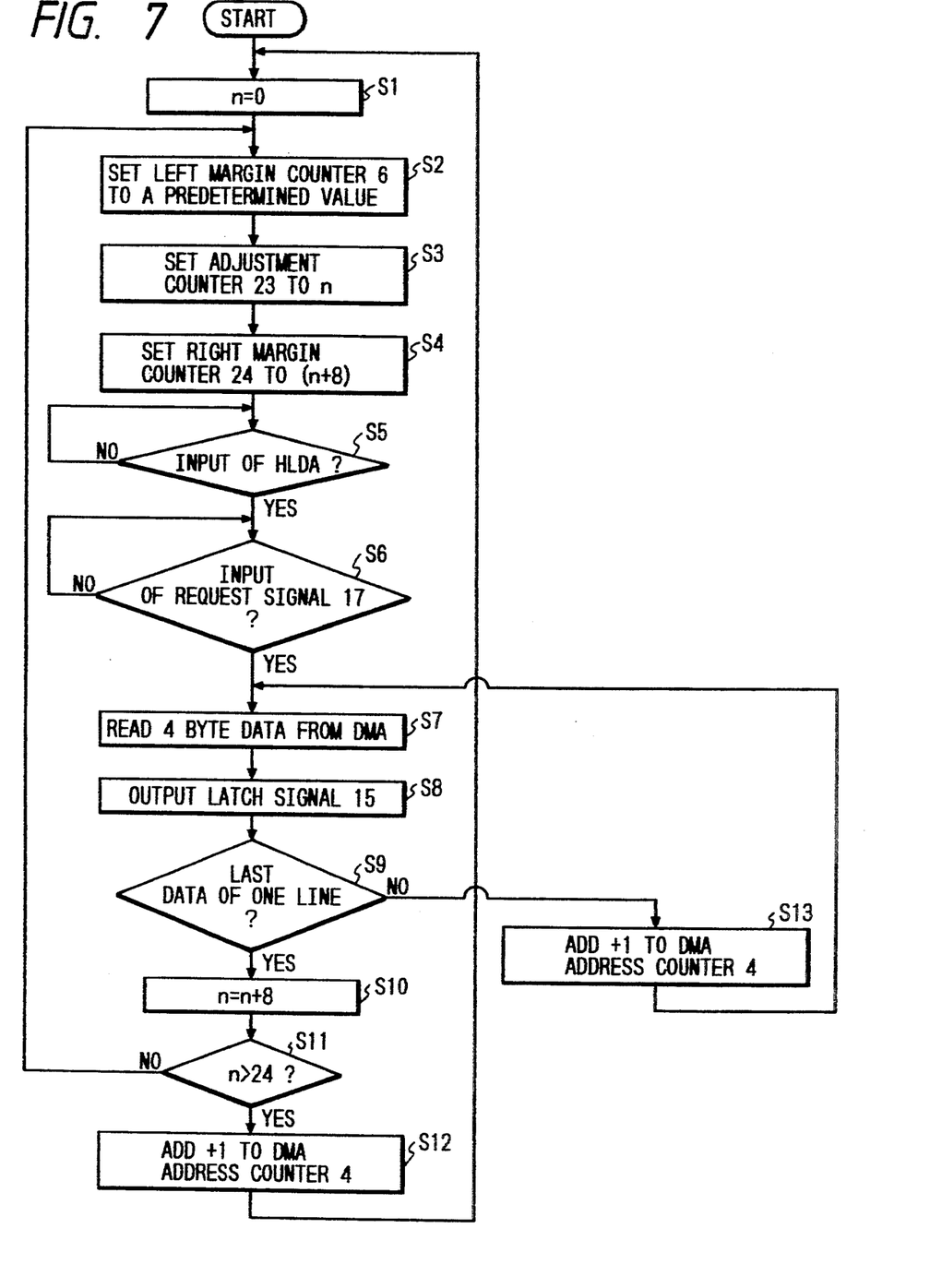
FIG. 7 is a flow chart showing DMA transfer processing in a DMA timing generation circuit in the video interface unit of the embodiment.

Description of Operation (FIGS. 6 and 7)

FIG. 6 shows the formats of the start and last data of each of four lines to be printed by the printer of this embodiment. The following description is associated with a case wherein the amount of data to be printed on one line is (an integer multiple of 4 bytes+1 byte).

Referring to FIG. 6, the data of the first line includes start data 601 and last data 602. Only first 1-byte data 603 of the last data 602 is printed on the first line, while remaining 3-byte data 604 is printed at the start of the second line. Similarly, first 2-byte data 608 of last data 605 of the second line is printed on the second line, while remaining 2-byte data 609 of the last data 605 is printed at the start of the third line. First 3-byte data (24 bits) 610 of last data 606 of the third line is printed on the third line, while remaining 1-byte data 611 is printed at the start of the fourth line. All last data 607 is printed on the fourth line.

In this case, "0" and "8" are respectively set in the adjustment counter 23 and the right margin counter 24 when DMA transfer of the first line is started. With this operation, the first 1-byte data of the start data 601 is converted into the video signal 18 (because the value of the adjustment counter 23 is "0"), and only the first 1-byte data (8 bits) 603 of the last data 602 is printed on the first line (because the value of the right margin counter 24 is "8"). When access to the last data 602 of the first line is completed, since the DMA timing generation circuit 3 does not output the counter clock 14, the value of the DMA address counter 4 is kept unchanged. That is, the last data address of the first line coincides with the start DMA transfer address of the second line. As a result, the last data 602 of the first line coincides with the start data of the second line.

When the DMA transfer of the first line is completed, the DMA timing generation circuit 3 sets "8" and "16" in the adjustment counter 23 and the right margin counter 24, respectively, through the bus 16. With this setting, for the second line, the ninth and subsequent bits of the start data 602 are output as the video signal 18 as second-line data, and the first 2-byte (16 bits) data 608 of the last data 605 of the second line is output as the video signal 18 of the second line.

More specifically, upon detection of the BD signal 20 corresponding to the second line, similar to the case of the first line, the left margin counter 6 counts the video signals 19. When the counter 6 counts up to a predetermined value (based on the distance 300 described above), it outputs the video transfer request signal 17 to the DMA timing generation circuit 3. With this operation, the start data 602 is latched by the parallel-serial conversion unit 5 by DMA and is output as the serial signal 21 in response to the next video clock signal 19. At this time, "8" is set in the adjustment counter 23, and the left video permission signal 27 is in a false state (low level). For this reason, the video signal 18 is not output until the video clock signals 19 corresponding to 8 bits are counted. When the adjustment counter 23 counts the video clock signals 19 up to "8", the left video permission signal 27 is set in a truth state (high level), and the video signal 18 is output. In this manner, for the second line, the ninth and subsequent bits of the start data 602 are output as the video signal 18.

As described above, the values respectively set in the adjustment counter 23 and the right margin counter 24 are: "0" and "8" for the first line; "8" and "16" for the second line; "16" and "24" for the third line; and "24" and "32" for the fourth line. With this setting, the data read operation and the conversion to video signals shown in FIG. 6 can be performed. Since the data at the last position of the fourth line does not include the start data of the fifth line, the DMA timing generation circuit 3 outputs the counter clock 14 to increment the DMA address counter 4 by one. That is, if all data which is accessed to obtain data at the last position of each line is data at the last position, the DMA address counter is incremented to access the next address at the start of the next line. Otherwise, the same address is accessed at the last position of the corresponding line and at the start of the next line. With this operation, the first half portion of the accessed data is used at the last position, and the last half portion of the same data is used at the start of the next line.

With this operation, the boundaries of one-line data need not be matched with those of the transfer units (4 bytes each) of DMA. That is, the method of the present invention does not require an empty data storage area required for this matching of boundaries as in the conventional method.

FIG. 7 is a flow chart showing an operation of the DMA timing generation circuit 3 in the video interface circuit of the embodiment. The processing shown in this flow chart is equivalent to the processing shown in FIG. 6 and is started after the DMA request signal (HOLD) 8 is output to the CPU 100.

In step S1, a count n is reset to "0". The count n is set in the RAM (not shown) of the DMA timing generation circuit 3. In step S2, a predetermined value is set in the left margin counter 6 in the above-described manner. In step S3, the value n ("0" at first) is set in the adjustment counter 23. In step S4, a value (n+8) ("8" at first) is set in the right margin counter 24.

When setting of the initial values in the respective counters is completed in this manner, the flow advances to step S5 to check whether the response signal 9 (HLDA) is sent from the CPU 100. If YES in step S5, a wait state is set in step S6 to wait for input of the DMA transfer request signal 17 from the left margin counter 6.

With this operation, DMA transfer from the frame buffer 107 is started. In step S7, 4-byte data is read out from the frame buffer 107. In step S8, the latch signal 15 is output to latch the 4-byte data in the parallel-serial conversion unit 5. The flow then advances to step S9 to check on the basis of a DMA transfer count designated by the CPU 100 in advance whether the last data of one line is DMA-transferred. If NO in step S9, the flow advances to step S13. In step S13, the counter clock 14 is output to increment the DMA address counter 4 by one. With this operation, 4-byte data is read out from the next address of the frame buffer 107 by DMA transfer in step S7.

If YES in step S9, the flow advance to step S10 to increment the count n by eight. If it is determined in step S11 that the count n is smaller than 24, i.e., printing of four lines is not completed, the flow returns to step S2 to execute the same processing as described above. If it is determined in step S11 that printing of four lines is completed, since n=24, the flow advances to step S12. In step S12, the clock signal 14 is output to increment the DMA address counter 4 by one. The flow then returns to step S1 to perform the next DMA transfer.

In the above-described embodiment, the amount of print data of one line is an integer multiple of 4 bytes + 1 byte. It is apparent, however, that the present invention can be applied to a case wherein one line has a different data amount, e.g., an even number of bytes other than a multiple of 4 bytes. In this case, it is only required that "0" and "1" be respectively set in the adjustment counter 23 and the right margin counter 24 for the first DMA transfer operation, and "16" and "0" be respectively set therein for the second DMA transfer operation. In addition, a DMA transfer address at a start position can be obtained by incrementing an address at the last position of every other line. That is, it is only required that the DMA address counter 4 be incremented by one in response to the clock signal 14 upon completion of output of print data of every other line.

In this embodiment, the data unit of DMA transfer is set to be 4 bytes. It is apparent that the present invention is not limited to this but a different number of bytes may be set as a data unit.

In general, if the remainder obtained by dividing the data length of one line by the transfer unit of DMA is n bits, "0" and "n" are respectively set in an adjustment counter and a right margin counter when the data of a first line is output. Subsequently, both the counters are incremented by the value n. When the value of the right margin counter becomes an integer multiple of the transfer unit for the first time, the next address is accessed at the timing of the start of the next line, and the same values as those for the first line are respectively set in the two counters. DMA transfer processing can be performed by repeating this operation.

As has been described above, according to this embodiment, if the data amount of one line is not an integer multiple of the transfer unit of DMA, data at the same address is accessed for the last portion of a given line and for the start portion of the next line. For the last portion of the given line, bits, of the accessed data, located before a position designated by a value set in the right margin counter 24 are output. For the start portion of the next line, bits, of the accessed data, located after a position designated by a value set in the adjustment counter 23 are output. Therefore, data subjected to DMA can be continuously stored in a packed state regardless of the data length of one line and the transfer unit of DMA, thus improving the utilization efficiency of the memory.

In this embodiment, print data stored in the memory is output to the printer. However, the present invention is not limited to this. For example, the present invention can be applied to cases wherein print data is output to a display unit and a communication unit.

As has been described above, according to the present invention, while output data is stored in the memory in a packed state, data of each line can be sequentially read out and output by DMA.

What is claimed is:

1. An output control method for controlling line-by-line output of data stored in a memory by direct memory access, where a first length of data in a line is other than an integer multiple of a second length of data in a data unit for data transmission by direct memory access, said method comprising the steps of:

performing a first direct memory access to the memory to obtain last data of a first line;

outputting a predetermined number of bits of a forward portion of the last data of the first line obtained by the first direct memory access as the last data;

checking whether a number of bits of the last data of the first line is larger than the predetermined number of bits output in said outputting step;

performing a second direct memory access with respect to data at the same address as that in the first direct memory access to obtain first data of a second line next to the first line when the number of bits of the last data of the first line is larger than the predetermined number of bits output in said outputting step; and outputting second data obtained by the second direct memory access except for the predetermined number of bits of the forward portion output in said outputting step, as the first data of the second line.

2. A method according to claim 1, further comprising the steps of:

performing a third direct memory access to an address next to the address in the first direct memory access to obtain start data of the second line next to the first line when the number of bits of the first data is not larger than the predetermined number; and outputting all of the bits of third data obtained by the third direct memory access as the start data.

3. A method according to claim 1, wherein said step of performing the first direct memory access includes a step of judging whether a direct memory access is to obtain last data of the first line.

4. A method according to claim 3, wherein said step of judging is performed by counting the number of direct memory access operations, and comparing the counted number with a preset value.

5. A method according to claim 1, further comprising the step of updating the predetermined number of bits output in said outputting step.

6. An output control apparatus for controlling line-by-line output of data stored in a memory by direct memory access, where a first length of data in a line is other than an integer multiple of a second length of data in a data unit for data transmission by the direct memory access, said apparatus comprising:

access means for performing direct memory access to the memory;

output means for outputting data obtained by said access means;

first access control means for controlling said access means to perform a first direct memory access to the memory to obtain last data of a first line;

first output control means for controlling said output means to output a predetermined number of bits of a forward portion of the last data of the first line obtained by the first direct memory access as the last data;

determining means for determining whether a number of bits of the last data of the first line is larger than the predetermined number;

second access control means for controlling said access means to perform a second direct memory access with respect to data at the same address as that in the first direct memory access to obtain first data of a second line next to the first line when said determining means determines that the number of bits of the last data of the first line is larger than the predetermined number of bits output by said first output control means; and second output control means for controlling said output means to output second data obtained by the second direct memory access except for the predetermined number of bits of the forward portion output by said first output control means, as the first data of the second line.

* * * * *